United States Patent
Yamazaki et al.

(10) Patent No.: US 7,754,998 B2
(45) Date of Patent: Jul. 13, 2010

(54) FOCUS ADJUSTER FOR LASER BEAM MACHINE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 535 days.

(21) Appl. No.: 11/121,614

(22) Filed: May 4, 2005

(65) Prior Publication Data

US 2005/0263507 A1    Dec. 1, 2005

(30) Foreign Application Priority Data

May 26, 2004   (JP)   ............... 2004-156131

(51) Int. Cl.
 *B23K 26/04*  (2006.01)
(52) U.S. Cl. ............... 219/121.62; 219/121.83
(58) Field of Classification Search ...............
 219/121.61–121.72, 121.78, 121.81; 250/201.2
 See application file for complete search history.

(56) References Cited

U.S. PATENT DOCUMENTS

| | | | |
|---|---|---|---|
| 3,744,124 A * | 7/1973 | Gardner | 483/8 |
| 4,154,529 A * | 5/1979 | Dyott | 356/28 |
| 4,499,650 A * | 2/1985 | Cannon et al. | 483/3 |
| 5,210,735 A * | 5/1993 | Hoshino et al. | 369/53.13 |
| 5,220,450 A * | 6/1993 | Iizuka | 359/205.1 |
| 5,376,061 A * | 12/1994 | Suzuki | 483/13 |
| 5,497,366 A * | 3/1996 | Fujisawa | 369/112.24 |
| 5,854,460 A | 12/1998 | Graf et al. | |
| 5,969,335 A * | 10/1999 | Karasaki | 250/205 |
| 6,097,020 A * | 8/2000 | Karasaki | 250/205 |
| 6,407,360 B1 | 6/2002 | Choo et al. | |
| 6,914,678 B1 * | 7/2005 | Ulrichsen et al. | 356/429 |
| 6,992,960 B2 * | 1/2006 | Kawashima et al. | 369/53.22 |
| 7,345,814 B2 * | 3/2008 | Yoneyama et al. | 359/383 |
| 2002/0013577 A1 * | 1/2002 | Frey et al. | 606/5 |
| 2006/0043077 A1 * | 3/2006 | Nittner et al. | 219/121.75 |
| 2007/0008534 A1 * | 1/2007 | Lo et al. | 356/401 |

FOREIGN PATENT DOCUMENTS

| | | | |
|---|---|---|---|
| JP | 355099049 A | * | 7/1980 |
| JP | 359030636 A | * | 2/1984 |

(Continued)

OTHER PUBLICATIONS

Chinese Office Action for corresponding Application No. 200510075500.2 dated Dec. 28, 2007.

(Continued)

*Primary Examiner*—Samuel M Heinrich
(74) *Attorney, Agent, or Firm*—Renner, Otto, Boisselle & Sklar, LLP

(57) ABSTRACT

The invention provides a focus adjuster for laser beam machine which adjusts focus by detecting reflected light of a laser beam in a laser beam machine.

A laser beam outputted from a laser oscillator device 550 is reflected by a mirror 570 via an output mirror 560 and introduced into a laser machining tool. The laser beam collected by a machining lens 62 is reflected by a reflector plate $M_1$ and sensed by a reflection detector 580. Automatic focus adjustment is achieved by sensing output of the reflected light as well as changes in focal position due to contamination of the machining lens 62.

5 Claims, 10 Drawing Sheets

FOREIGN PATENT DOCUMENTS

| | | | | |
|---|---|---|---|---|
| JP | 360066226 A | * | 4/1985 | |
| JP | 60-184485 | | 9/1985 | |
| JP | 360172434 A | * | 9/1985 | |
| JP | 362173629 A | * | 7/1987 | |
| JP | 62-254993 | | 11/1987 | |
| JP | 363102854 A | * | 5/1988 | |
| JP | 402278530 A | * | 11/1990 | |
| JP | 404170727 A | * | 6/1992 | |
| JP | 405042384 A | * | 2/1993 | |
| JP | 06-007980 | | 1/1994 | |
| JP | 406335787 A | * | 12/1994 | |
| JP | 08-174255 | | 7/1996 | |
| JP | 409212892 A | * | 8/1997 | |
| JP | 09-225661 | | 9/1997 | |
| JP | 11-129084 | | 5/1999 | |
| JP | 02000312985 A | * | 11/2000 | |
| JP | 2001-138082 | | 5/2001 | |
| JP | 2001-340979 | | 12/2001 | |
| JP | 02002103157 A | * | 4/2002 | |
| JP | 2002-321080 | | 11/2002 | |
| JP | 2002-346783 | | 12/2002 | |

OTHER PUBLICATIONS

European Search Report for corresponding Application No. 05009907.6 dated Aug. 28, 2008.

* cited by examiner

FOCUS ADJUSTER FOR LASER BEAM MACHINE

The present application is based on and claims priority of Japanese patent application No. 2004-156131 filed on May 26, 2004, the entire contents of which are hereby incorporated by reference.

BACKGROUND OF THE INVENTION

1. Field of the Invention

The present invention relates to a focus adjuster which prevents machining defects caused by changes in focal position of a machining lens due to contamination of the machining lens in order to make it possible to use unskilled operators in operating a laser beam machine, maximize quality and productivity for each material and workpiece thickness, and accomplish long, unattended operation under optimum machining conditions.

2. Description of the Related Art

Conventionally, focal position of a laser beam narrowed by a machining lens is set beforehand in the thickness direction of a workpiece (e.g., along a Z axis). To set the focal position of the machining lens, a laser beam of appropriate power is emitted continuously and the machining lens is brought close to the workpiece surface, and when focus is achieved, plasma rays (blue rays) are generated on the workpiece surface. When the operator recognizes the plasma rays, he/she stops the movement of the machining lens in the thickness direction and inputs this position as a standard focal position in an NC system (number control system).

There is a known technique which detects the plasma rays generated during a focusing operation, using an optical sensor installed in a nozzle mount of a machining head, and thereby adjusts the focal position automatically (see Japanese Patent Laid-Open Publication No. 6-7980 (Patent Document 1).

The focal position of the machining lens set in this way is not always constant, but varies due to contamination or the like of the machining lens, causing a deviation between standard focal position and optimum focal position and resulting in machining defects such as degradation of machining quality. Consequently, the operator must manually adjust the focal position of the machining lens in the thickness direction based on experience.

Furthermore, to adjust the focal position of the machining lens, a torch must be removed manually.

Consequently, the machining lens gets contaminated, being open to the air in the factory.

SUMMARY OF THE INVENTION

The present invention provides a focus adjuster for a laser beam machine to solve the above problems.

A laser beam machine according to the present invention comprises, as basic means, a bed, a pallet which is disposed on the bed and holds a workpiece, a column which moves along an X axis, that is, in a longitudinal axis of the bed, a saddle which is supported by the column and moves along a Y axis orthogonal to the X axis, and a machining head which is supported by the saddle and moves along a Z axis perpendicular to a plane formed by the X axis and Y axis, a laser oscillator device, an output mirror, a mirror which leads laser to a laser machining tool, and an optical path system equipped with a machining lens which collects the laser.

Also, it comprises means for adjusting focal position of the laser to compensate for contamination of the machining lens using reflected light detected by a reflection detector.

Another laser beam machine according to the present invention comprises means for adjusting focal position of the laser using reflected light detected by a reflection detector installed near a work surface.

The reflection detector detects plasma and is disposed between the machining lens and the mirror.

According to the present invention, the focal position of the machining lens is kept constant, and even if the thickness of the machining lens changes due to contamination or the like, optimum focal position is maintained automatically, resulting in improved machining quality and enabling long, unattended operation without machining defects.

DETAILED DESCRIPTION OF THE PREFERRED EMBODIMENTS

Figure 1:
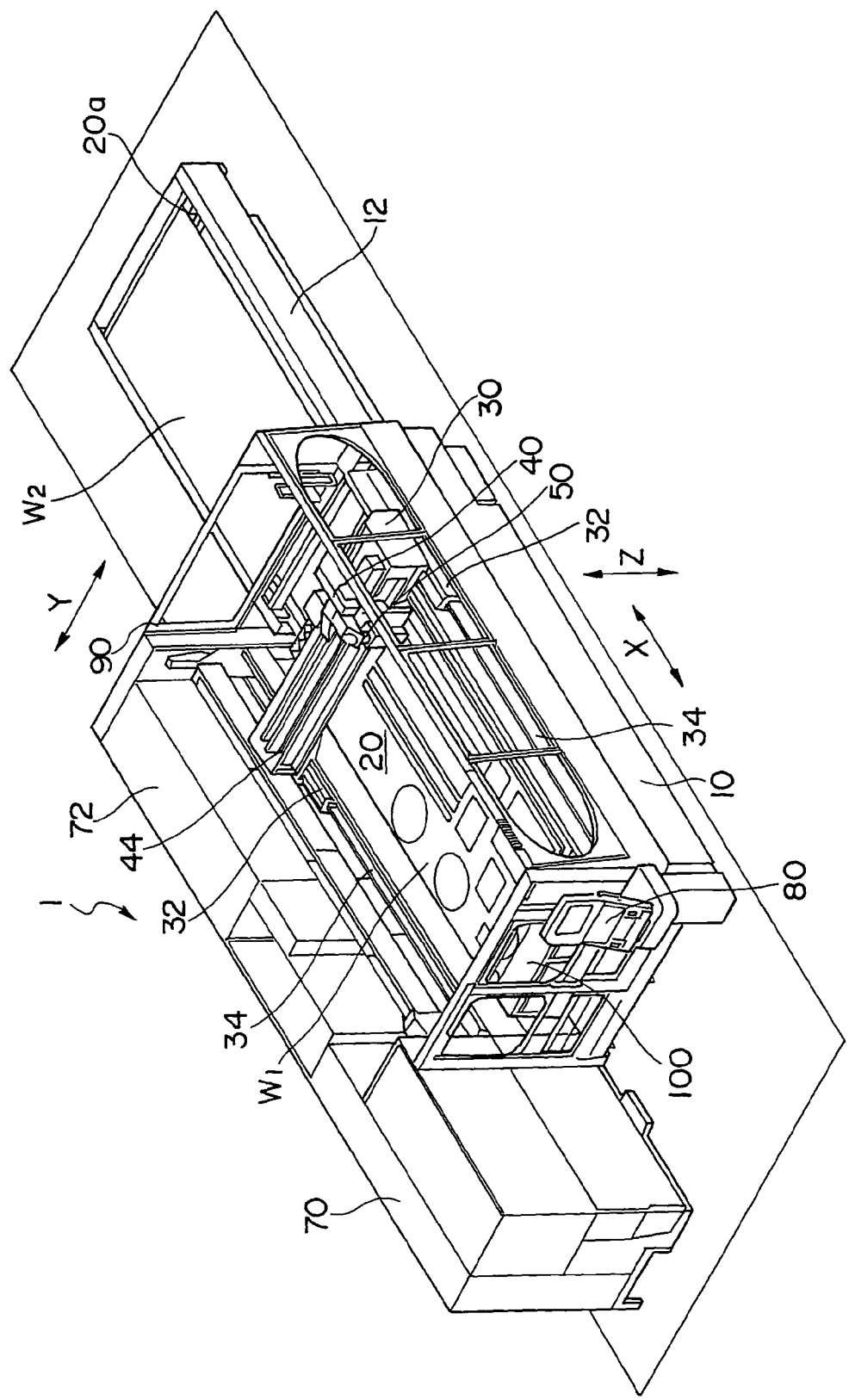
FIG. 1 is a perspective view showing an entire laser beam machine according to the present invention.
Figure 2:
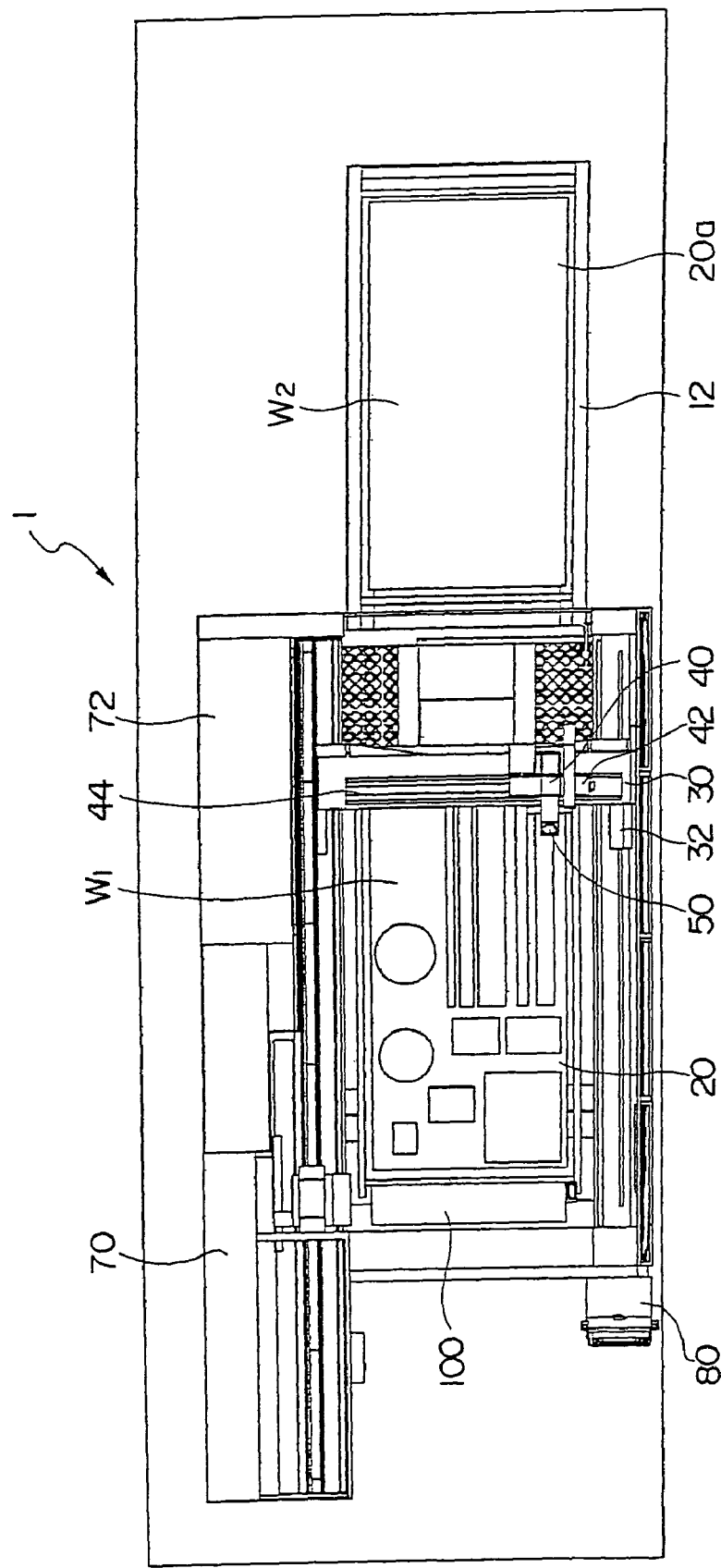
FIG. 2 is a plan view of the laser beam machine according to the present invention.
Figure 3:
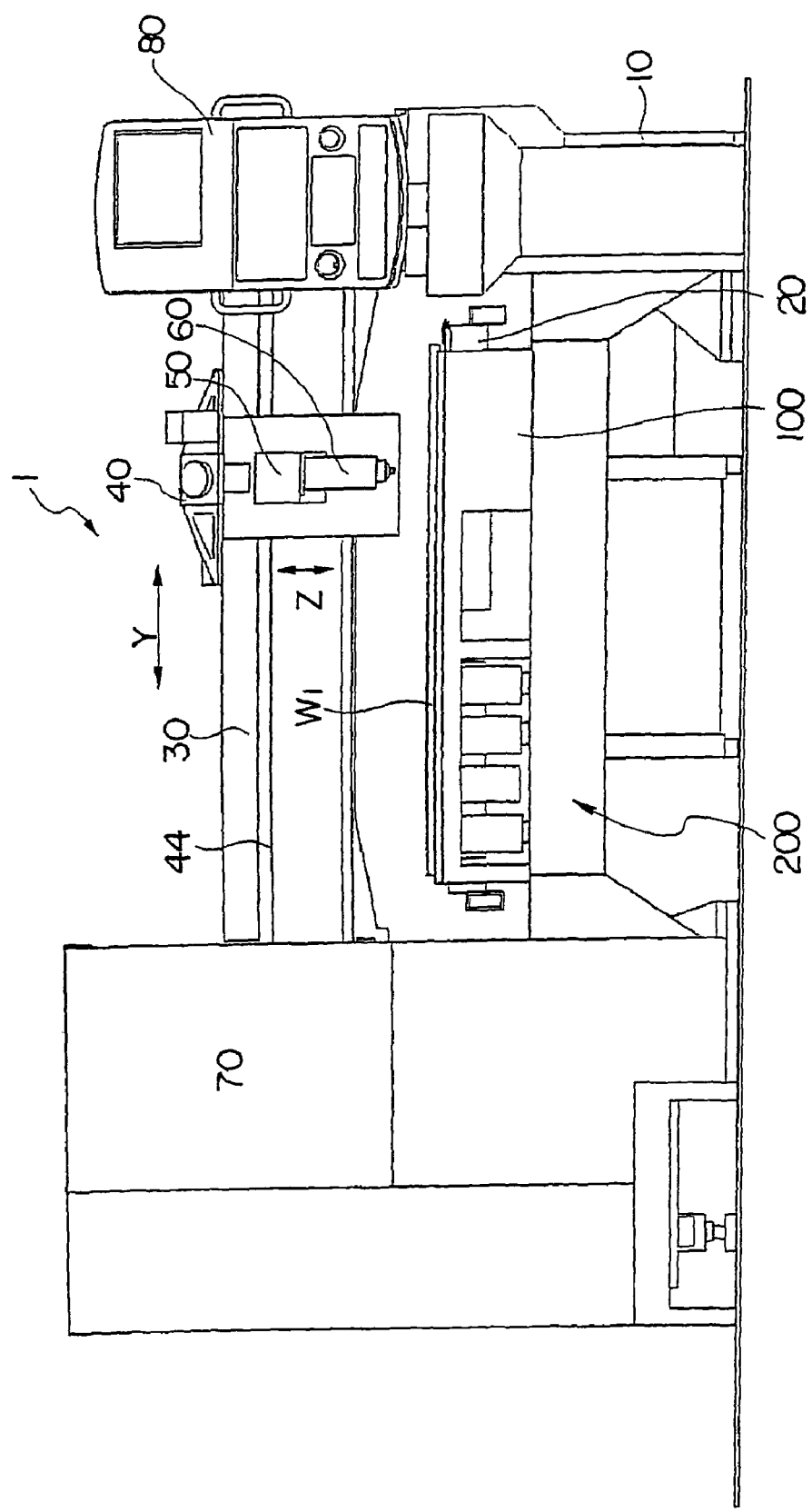
FIG. 3 is a front view of essential part of the laser beam machine according to the present invention.
Figure 4:
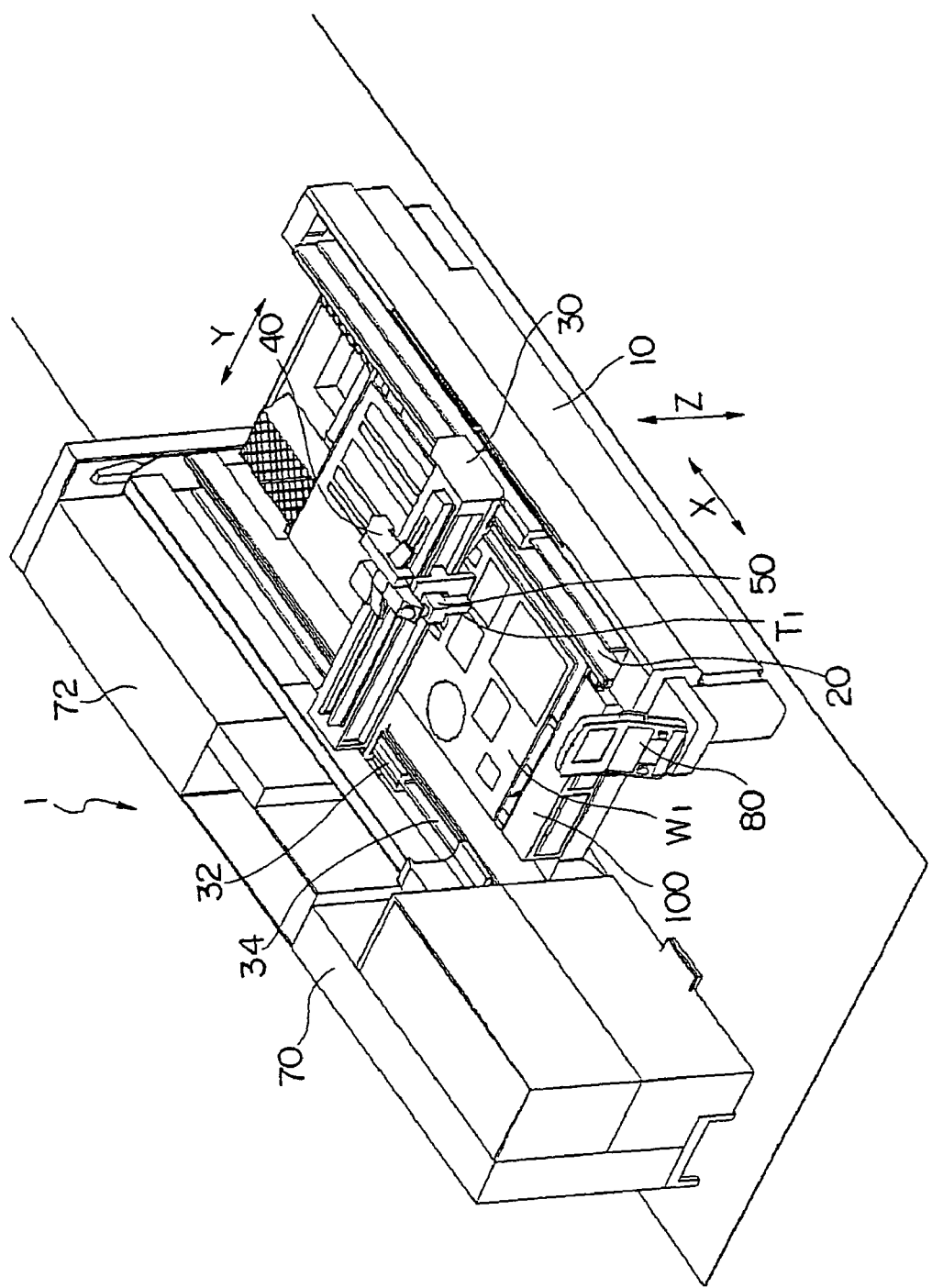
FIG. 4 is a perspective view of the essential part of the laser beam machine according to the present invention.
Figure 5:
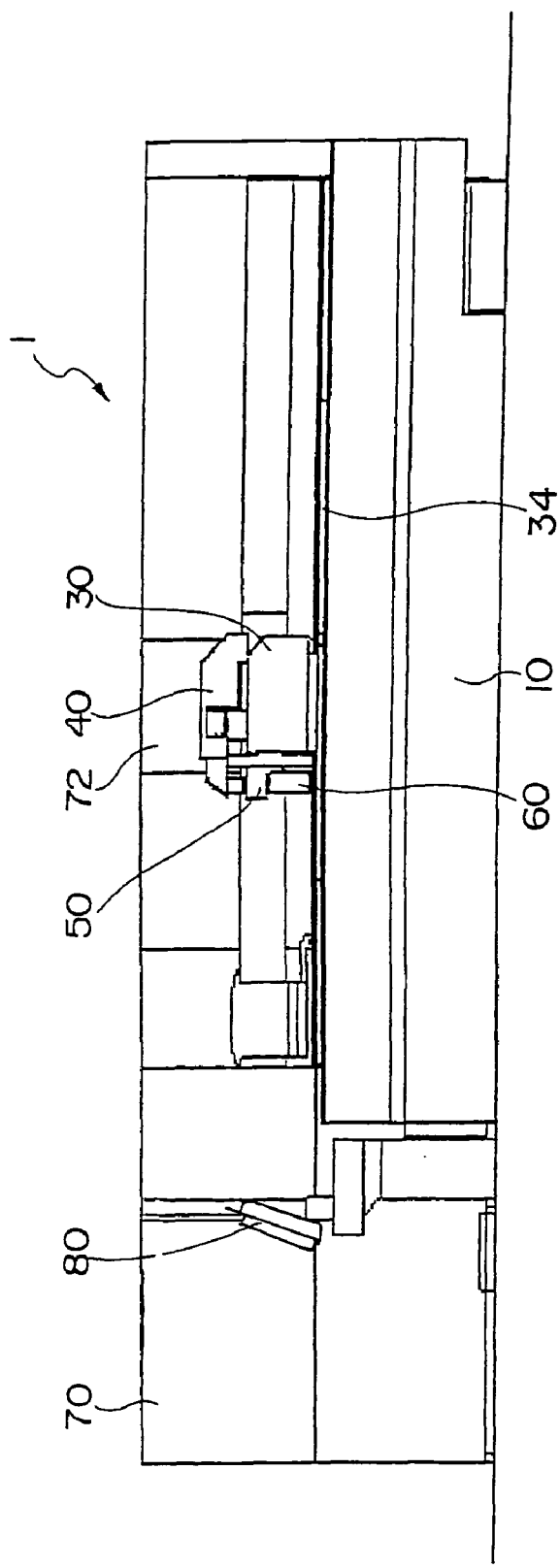
FIG. 5 is a side view of the essential part of the laser beam machine according to the present invention.

FIG. 1 is a perspective view showing an overall configuration of a laser beam machine according to the present invention, FIG. 2 is a plan view, FIG. 3 is a front view, FIG. 4 is a perspective view of the relevant portion; and FIG. 5 is a side view.

A laser beam machine, generally denoted by reference number 1, has a pallet (table) 20 which is disposed on a bed 10 to carry a plate-shaped workpiece $W_1$. A pallet changer 12 is placed on the longitudinal extension of the bed 10, and a pallet 20a carrying a workpiece $W_2$ to be machined next is awaiting its turn.

A pair of guide rails 34 are installed on both sides of the bed 10 along its length and a column 30 is mounted on the guide rails 34 in such a way as to be movable along an X axis.

Means for driving the column 30 along the X axis is provided by, for example, a linear motor, which is formed by a stator installed on the guide rails 34 and a moving member installed on a linear-motion guide 32.

A guide rail 44 is installed on the column 30 along a Y axis orthogonal to the X axis and a saddle 40 is mounted in such a way as to be movable along the Y axis. The saddle 40 is equipped with a linear-motion guide 42 which is engaged with the guide rail 44. A linear motor is formed by the guide rail 44 and linear-motion guide 42.

The saddle 40 has a guide rail installed along a Z axis perpendicular to the plane formed by the X axis and Y axis and has a machining head 50 mounted in such a way as to be movable along the Z axis. The machining head 50 has an optical system which admits a laser beam from a laser oscillator 72.

The machining head 50 is equipped replaceably with a laser machining tool 60. A machining area is fitted with a cover 90 to ensure safety. A power panel 70 and the laser oscillator 72 are disposed adjacent to the bed 10. A control panel 80 for use by the operator to give various commands is disposed on a longitudinal end of the bed 10. A setup station 100 for laser machining tools is installed on that end of the bed 10 which is closer to the control panel 80.

Figure 6:
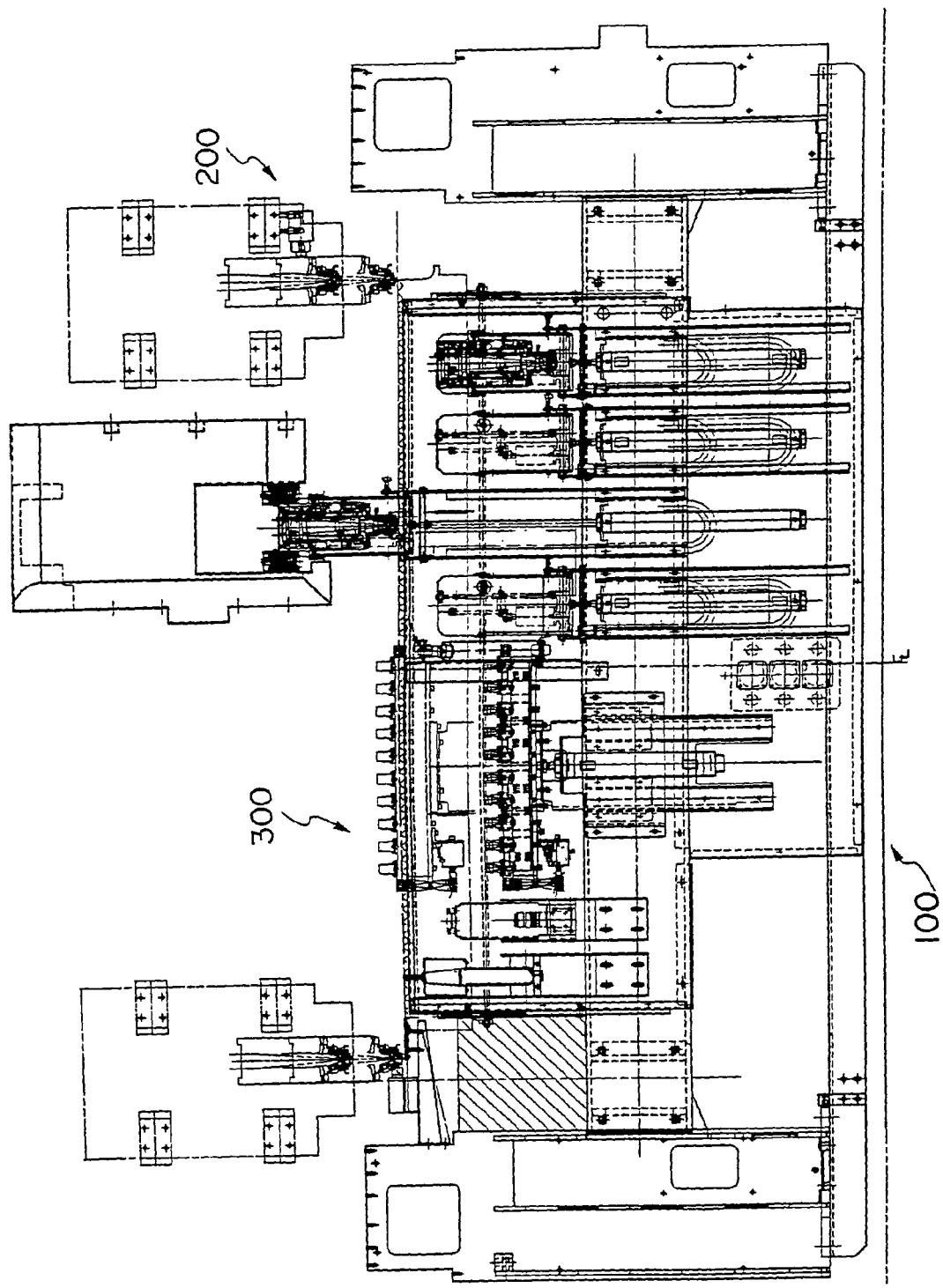
FIG. 6 is a front view of a setup station for laser machining tools.
Figure 7:
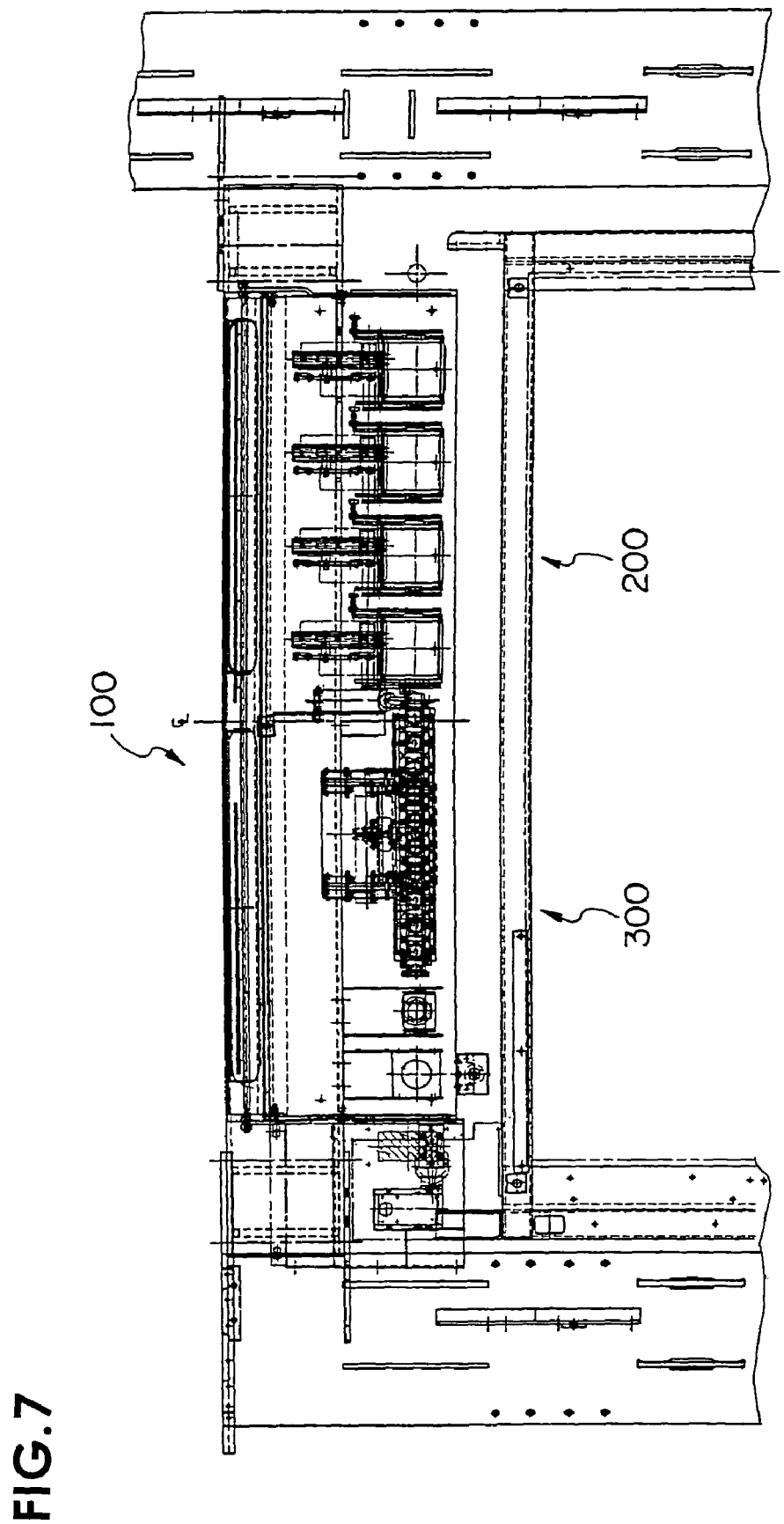
FIG. 7 is a plan view of the setup station for laser machining tools.

FIG. 6 is a front view of the setup station 100 for laser machining tools as viewed from the table and FIG. 7 is a plan view.

The setup station 100 for laser machining tools includes a tool station 200 and nozzle station 300, where the tool station 200 is equipped with a tool change magazine for laser machining tools which in turn are equipped with a torch and nozzle while the nozzle station 300 is equipped with a nozzle change magazine for nozzles of laser machining tools.

Figure 8:
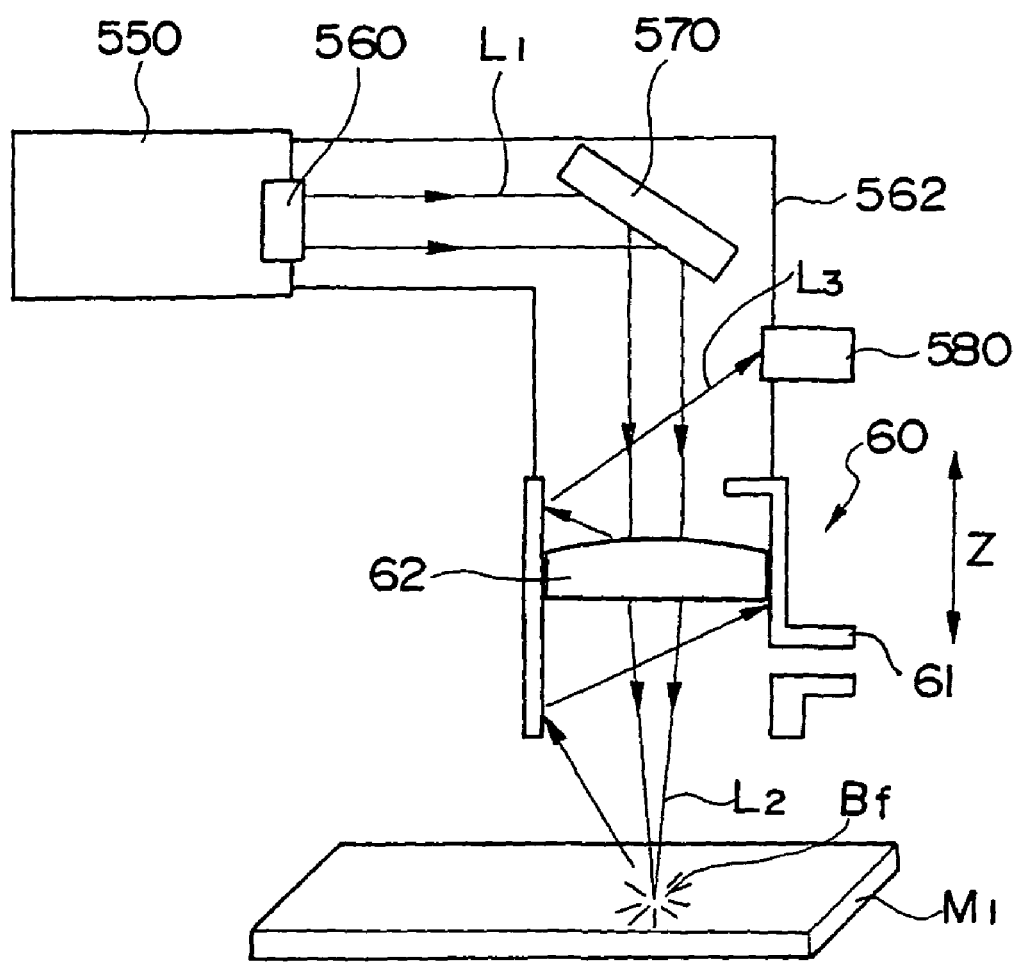
FIG. 8 is an explanatory diagram illustrating a focus adjuster.
Figure 9:
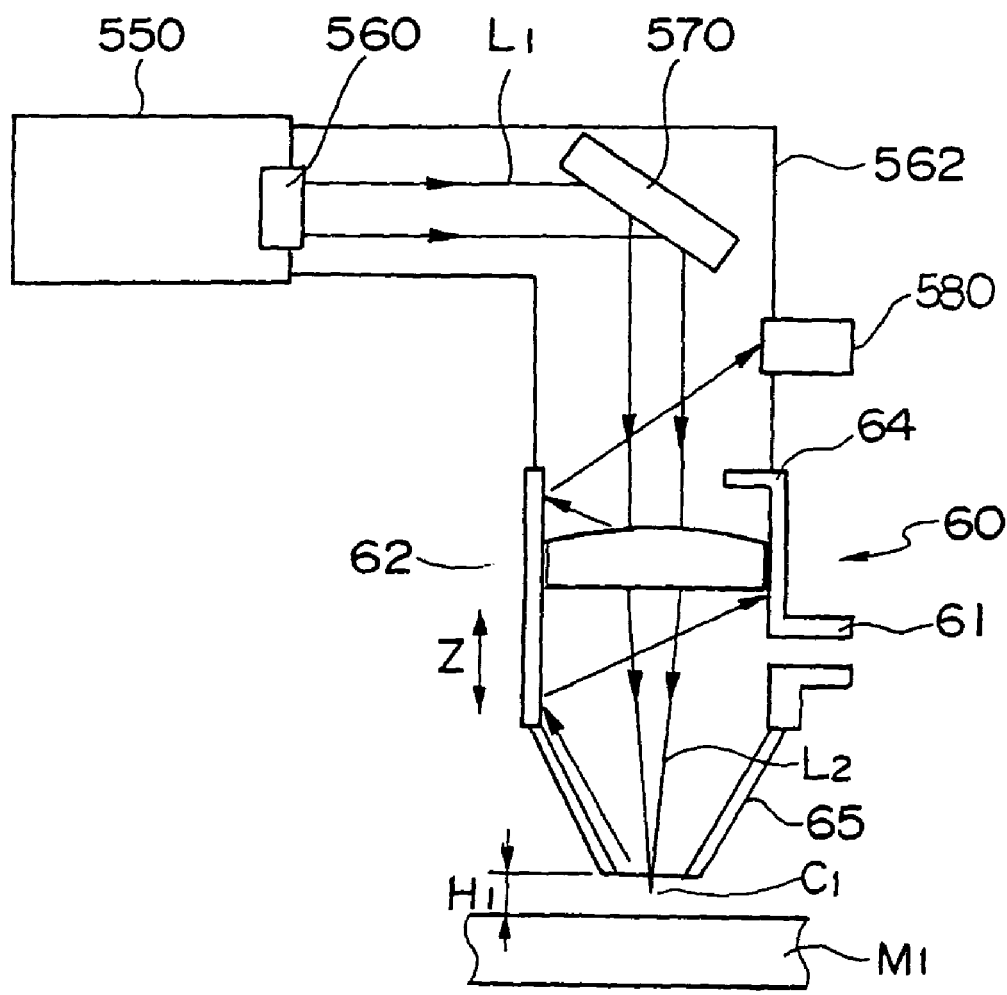
FIG. 9 is an explanatory diagram illustrating the focus adjuster.

FIG. 8 is an explanatory diagram illustrating a focus adjuster for the laser beam machine according to the present invention. FIG. 9 is an explanatory diagram of operation.

An optical path system of the laser beam machine comprises a laser oscillator device 550. Laser light $L_1$ outputted from an output mirror 560 is reflected by a mirror 570 in a tube 562 and introduced into the laser machining tool 60. A machining lens 62 placed in the torch of the laser machining tool 60 collects the laser light $L_1$ supplied as parallel rays and emits it through the nozzle 65. Position of a focus $C_1$ is set near a surface of a focal position detecting reflector plate $M_1$ according to workpiece thickness or the like.

Necessary assist gas is supplied to the laser machining tool 60 via a supply hole 61.

The laser beam $L_2$ collected by the machining lens 62 is reflected by the focal position detecting reflector plate $M_1$, and the reflected light $L_3$ is detected by a reflection detector 580 installed above the machining lens 62.

When the output of the laser oscillator device 550 is set to an appropriate value and the laser machining tool 60 is adjusted along the Z axis to compensate for contamination of the machining lens 62, as the laser beam $L_2$ is focused on a surface of the focal position detecting reflector plate (e.g., a stainless plate or iron plate) $M_1$, high-brightness blue plasma known as a blue flame Bf is generated.

By sensing the blue flame Bf, the reflection detector 580 detects that the machining lens 62 is focused on the surface of the focal position detecting reflector plate $M_1$.

If height position $H_1$ from the tip of the nozzle 65 to the surface of the focal position detecting reflector plate $M_1$ is set as the Z-axis value of the laser machining tool 60, it is possible to focus on the surface of the workpiece automatically.

Incidentally, the focus adjustment described in the above example can be made using the actual workpiece instead of the focal position detecting reflector plate $M_1$.

Figure 10:
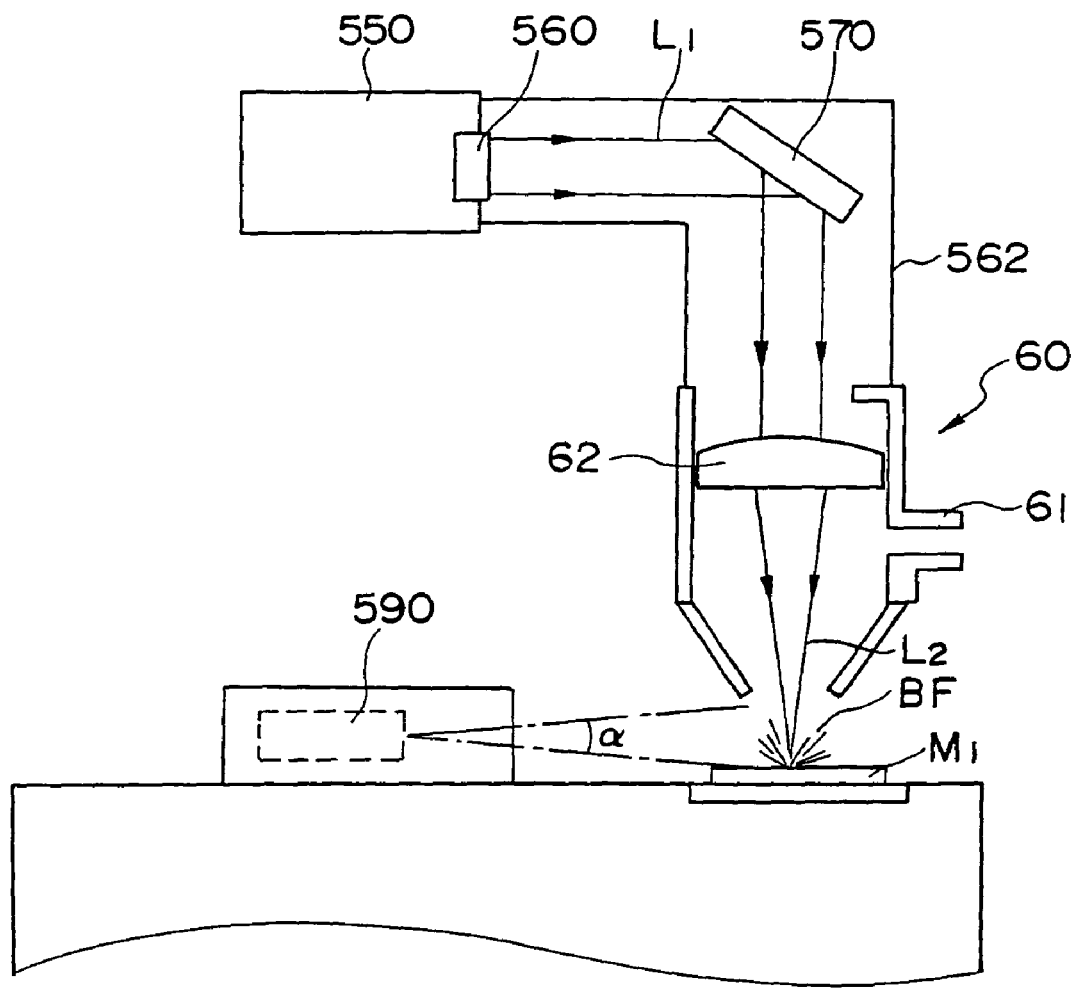
FIG. 10 is an explanatory diagram illustrating a focus adjuster according to another example.

FIG. 10 is an explanatory diagram illustrating a focus adjuster of the laser beam machine according to another example of the present invention.

The setup station for laser machining tools is equipped with a focus adjuster 590 in addition to the tool station and nozzle station.

The laser beam collected by the machining lens is reflected by the focal position detecting reflector plate and the reflected light is detected by the reflection detector installed near the focal position detecting reflector plate.

When the output of the laser oscillator device is set to an appropriate value and the laser machining tool is adjusted along the Z axis, as the laser beam is focused on a surface of the focal position detecting reflector plate $M_1$, high-brightness blue plasma known as a blue flame is generated.

By sensing the blue flame, the reflection detector 590 detects that the machining lens is focused on the surface of the focal position detecting reflector plate $M_1$.

If height position from the tip of the nozzle to the surface of the focal position detecting reflector plate is set as the Z-axis value of the laser machining tool, it is possible to focus on the surface of the workpiece automatically.

The rest of the configuration is the same as the example in FIG. 8. Thus, the same reference numbers as those in FIG. 8 are used and the description will be omitted.

Incidentally, although a linear motor has been cited in the above example as a driving means along the X and Y axes, the present invention can also be applied using a ball screw.

What is claimed is:

1. A laser beam machine comprising:
   a bed,
   a pallet which is disposed on the bed and holds a workpiece,
   a column which moves along an X axis in a longitudinal axis of the bed,
   a saddle which is supported by the column and moves along a Y axis orthogonal to the X axis,
   a machining head which is supported by the saddle and moves along a Z axis perpendicular to a plane formed by the X axis and Y axis,
   a laser machining tool equipped replaceably to the machining head,
   a setup station located at an end of the bed adjacent a control panel, which includes a tool station equipped with a tool change magazine for laser machining tools, to change the laser machining tool equipped replaceably to the machining head,
   a laser oscillator device, an output mirror, a mirror which leads a laser beam to the laser machining tool, and an optical path system equipped with a machining lens which collects the laser beam, and
   a focus adjuster comprising a reflection detector which detects light reflected from a work surface, and means for adjusting a focal position of the laser beam to compensate for contamination of the machining lens using the reflected light detected by the reflection detector.

2. The laser beam machine according to claim 1, wherein the laser machining tool comprises a torch which has optical means including a condenser lens, and a nozzle which is replaceably attached to a tip of the torch.

3. The laser beam machine according to claim 1, wherein the reflection detector of the focus adjuster detects plasma.

4. The laser beam machine according to claim 1, wherein the reflection detector of the focus adjuster is disposed between the machining lens and the mirror.

5. The laser beam machine according to claim 1, wherein the reflection detector of the focus adjuster is installed near the work surface.

* * * * *